(No Model.)
B. W. ROSS.
Fishing Float.
No. 239,063.                     Patented March 22, 1881.
Fig.1.                           Fig.2.
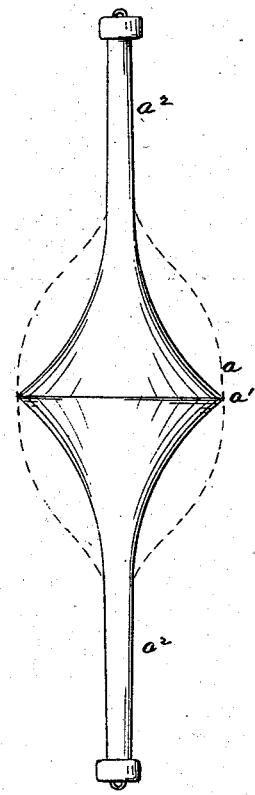
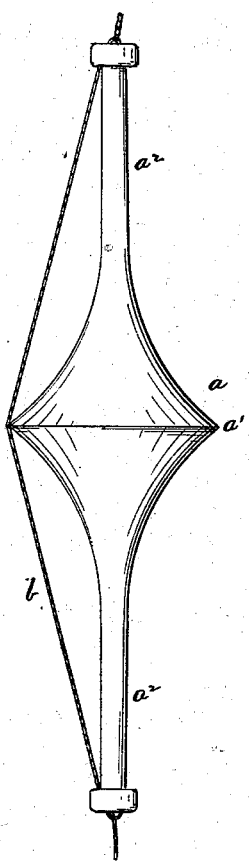
Witnesses:                            Inventor
M. M. Lacey                      Berkeley W. Ross
J. B. Hockerby                   By R. S. & A. P. Lacey Att'ys.

UNITED STATES PATENT OFFICE.

BERKELEY W. ROSS, OF CARTHAGE, MISSOURI.

FISHING-FLOAT.

SPECIFICATION forming part of Letters Patent No. 239,063, dated March 22, 1881.

Application filed December 10, 1880. (No model.)

*To all whom it may concern:*

Be it known that I, BERKELEY W. ROSS, a citizen of the United States, residing at Carthage, in the county of Jasper and State of Missouri, have invented certain new and useful Improvements in Fishing Corks or Floats; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish a float for fishing-lines which can be held in an upright position in the water with very light sinkers on the lower end of the line, and which will be more sensitive to the bite of the fish.

It consists in the peculiar construction of the float, as will be hereinafter fully explained and claimed.

In the drawings, Figures 1 and 2 are side elevations, showing the construction of my improved float.

The float in common use has its body made oval or round and presents a convex surface to the water. From the points of the oval or rounded float short stems or arms project, to which the line is attached. A float constructed in this manner will lie flat on its side on the surface of the water, or will be held upright by heavy sinkers fixed on the line when sinkers are employed heavy enough to bring the float to an upright position. They will also draw the body of the float more than half its length below the surface of the water. Round globular floats have long since gone out of general use, because they will not indicate with sufficient nicety the action of the fish at the hook. The oval form has been substituted for the round. The oval does not possess the sensitiveness desired, and its lack in this respect is due to its convex sides and to the fact that when brought to an upright position by heavy sinkers it is sunk more than half its bulk in the water. In order to get the best results from the oval float it must be brought and held in the vertical position indicated hereinbefore, and it cannot be brought into this position by sinkers of just weight enough to carry the hook to the bottom.

In my device I have provided a float free from the objections hereinbefore indicated, and which is also entirely free from the objections which would obtain against a float composed of a flat disk lying on the water and having stems projecting axially from its center to provide means for holding the line.

My float will be brought to an erect position and be held there by sinkers having just weight enough to carry down the hook. When erect, fully if not more than one-half of its bulk will be above the surface of the water, and it will respond to the slightest touch made on the hook.

In constructing my device the sides of the body $a$ are cut away equally on opposite ends, so as to give to the ends a bell shape, the concave surfaces of which meet and form a sharp central peripheral rim or edge, $a'$. The stems or arms $a^2$ $a^2$ project from the ends of the body $a$, and have the line $b$ fixed to them in any ordinary manner.

This float, by reason of its peculiar construction, possesses a superior sensitiveness, and indicates the actions of the fish with the utmost precision and accuracy possible to be attained.

Having thus described my invention, what I claim, and desire to secure by Letters Patent, is—

A float for fish-lines having its opposite ends cut away so as to form two equal bell-shaped or concave sections, the concave surfaces of which unite and form a central rim or edge, substantially as set forth.

In testimony whereof I affix my signature in presence of two witnesses.

BERKELEY W. ROSS.

Witnesses:
I. PERKINS,
ISAIAH W. DREISBACH.